(12) United States Patent
Wang et al.

(10) Patent No.: US 7,454,292 B2
(45) Date of Patent: Nov. 18, 2008

(54) INVERSE-VECTOR METHOD FOR SMOOTHING DIPS AND AZIMUTHS

(75) Inventors: Yuchun Eugene Wang, Dhahran (SA); Yi Luo, Dhahran (SA); Mohammed N. Alfaraj, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 11/787,246

(22) Filed: Apr. 13, 2007

(65) Prior Publication Data

US 2008/0255761 A1    Oct. 16, 2008

(51) Int. Cl.
*G06F 17/50* (2006.01)

(52) U.S. Cl. .............................. 702/17; 702/11; 702/12; 702/14; 703/5; 703/10; 367/73; 73/152.17; 250/256

(58) Field of Classification Search ............. 702/14–18, 702/10; 367/37, 73; 73/152.17; 324/323; 703/5, 10; 250/256
See application file for complete search history.

(56) References Cited

U.S. PATENT DOCUMENTS

| | | | |
|---|---|---|---|
| 3,652,980 A * | 3/1972 | Goupillaud | ................. 367/46 |
| 4,348,748 A | 9/1982 | Clavier et al. | |
| 4,453,219 A | 6/1984 | Clavier et al. | |
| 4,638,254 A | 1/1987 | Uhri | |
| 4,852,005 A | 7/1989 | Hepp et al. | |
| 5,038,378 A | 8/1991 | Chen | |
| 5,148,494 A | 9/1992 | Keskes | |
| 5,191,526 A | 3/1993 | Laster et al. | |
| 5,299,128 A | 3/1994 | Antoine et al. | |
| 5,588,032 A | 12/1996 | Johnson et al. | |
| 6,018,498 A | 1/2000 | Neff et al. | |
| 6,473,697 B2 | 10/2002 | Bouts et al. | |
| 6,516,274 B2 | 2/2003 | Cheng et al. | |
| 6,675,097 B2 | 1/2004 | Routh et al. | |
| 6,850,864 B2 | 2/2005 | Gillard et al. | |
| 6,993,433 B2 * | 1/2006 | Chavarria et al. | ............. 702/14 |
| 2002/0022930 A1 | 2/2002 | Bouts et al. | |
| 2005/0222774 A1 * | 10/2005 | Dulac et al. | ................... 702/14 |
| 2006/0122780 A1 | 6/2006 | Cohen et al. | |

OTHER PUBLICATIONS

"Fast structural interpretation with structure-oriented filtering," Fehmers and Hocker, Geophysics, vol. 68, No. 4 (Jul.-Aug. 2003): p. 1286-1293.

"Image structure analysis for seismic interpretation," Bakker, Technische Universiteit Delft, Chapter 2, Jun. 4, 2002.

(Continued)

*Primary Examiner*—Edward R. Cosimano
*Assistant Examiner*—Sujoy K Kundu
(74) *Attorney, Agent, or Firm*—Abelman, Frayne & Schwab

(57) ABSTRACT

A system and method using inverse-vector processing to iterate through a loop of three steps: set a guide direction, invert opposite vectors, and average vectors to update the guide direction, for smoothing seismic amplitude data. The inverse-vector method can overcome instabilities where the traditional structure-tensor approach fails. The inverse-vector smoothing is simple to implement and more computational efficient. The resultant dips and azimuths are spatially consistent and thus more interpretable and suitable for calculation of curvature and other dip based attributes.

14 Claims, 5 Drawing Sheets

OTHER PUBLICATIONS

"3-D broad-band estimates of reflector dip and amplitude," Marfurt and Kirlin, Geophysics, vol. 65, No. 1 (Jan.-Feb. 2000): p. 304-320.

"Computer Vision and Applications; A Guide for Students" Jahne and Haussecker, CD-ROM, pp. 335-343.

Al-Dossary, S., "3-D Volumetric Multispectral Estimates of Reflector Curvature and Rotation", Ph.D. thesis, University of Houston, 2003.

Luo Y., W.G. Higgs, and W.S. Kowalik, "Edge Detection and Stratigraphic Analysis Using 3-D Seismic Data", 66th Ann. Int'l. Mtg., Soc. Expl. Geophys. Expanded Abstracts, 1996, pp. 324-327.

* cited by examiner

INVERSE-VECTOR METHOD FOR SMOOTHING DIPS AND AZIMUTHS

FIELD OF THE INVENTION

The present invention relates to seismic data processing, and in particular to a system and method for smoothing dips and azimuths in volumetric seismic amplitude data.

BACKGROUND OF THE INVENTION

Seismic structure orientation, such as dip and azimuth features, has broad applications, including for structure orientated smoothing as described by Fehmers, G. C. and Hocker, C. F. W., "Fast Structural Interpretation with Structure-Oriented Filtering", Geophysics, Vol. 68, 2003, pp. 1286-1293; and for dip-steered coherence and curvature attributes as described by Al-Dossary, S., "3-D Volumetric Multispectral Estimates of Reflector Curvature and Rotation", Ph.D. thesis, University of Houston, 2003. Structure orientation itself provides stratigraphic and geographic information for seismic data processing and interpretation.

Dip and azimuth can be computed from seismic records without picking horizons, and the results are referred to as volumetric structure orientation. Several methods have been proposed to perform the task. A slant-stack approach that searches for the most coherent direction is intuitive, as described in Luo Y., W. G. Higgs, and W. S. Kowalik, "Edge Detection and Stratigraphic Analysis Using 3-D Seismic Data", 66th Ann. Int'l. Mtg., Soc. Expl. Geophys, expanded Abstracts, 1996, pp. 324-327. Frequency domain algorithms are also adopted in practice as described in Marfurt, K. and Kirlin, R., "3-D Broad-Band Estimates of Reflector Dip and Amplitude", Geophysics, Vol. 65, 2000, pp. 304-320.

Both of the above methods require relatively large data windows and suffer from a loss of resolution. The known finite difference method is straightforward, but it is a first-derivative operation and therefore is prone to amplify noise. A smoothing scheme is needed for two purposes: (a) to suppress the noise, and (b) to extract large-scale features. Although the finite difference method is straightforward, smoothing its results is not simple. Because dip and azimuth are computed through the normal direction of a wave front, there is a problem with the inversion of vectors. For example, both 0° and 180° dips are horizontal events, but their average, oriented at 90°, is vertical. In other words, normal directions cannot be taken as an average arithmetically unless some additional maneuver is performed.

Numerous attempts have been made in the prior art to improve smoothing of image data such as dips and azimuths, but with limited success. For example, U.S. Pat. Nos. 4,453,219 and 4,348,748 to Clavier et al. disclose methods which calculate dips and azimuths using multiple transducers spaced around a borehole for redundant indications of displacement using a dipmeter displacement processing technique, but the method is only applicable to well-log dipmeter data.

U.S. Pat. No. 4,638,254 to Uhri discloses an iterative process for producing a preferred geological orientation of a subsurface formation by generating original vectors representing the azimuth and dip of the measurements, converting original vectors into lineations, and vector-averaging selected unit vectors to produce a resultant vector which is used to indicate a preferred orientation of the formation. The process determines and displays the orientation of subsurface formations, but is applicable only to well-log data, and only smoothes over about five to twenty data points. It is inapplicable to the sizable sets of data points, that can include from 100 to 5,000 data points that are typical of seismic data. In addition, the disclosed process performs the computations by scanning and selecting the data points to be smoothed, but no iterative approach to processing the data points is disclosed.

U.S. Pat. No. 4,852,005 to Hepp et al. discloses a method which calculates dips and azimuths using correlation intervals to derive possible offsets, but it is only applicable to well-log data and the method uses continuity-based smoothing.

U.S. Pat. No. 5,038,378 to Chen discloses a system and method which reduce noise in seismic data by smoothing fine resistivity measurements made with a tool from inside a borehole and for detecting boundaries of features using semblance values to compute orientations.

U.S. Pat. No. 5,148,494 to Keskes discloses a system and method for image analysis for processing seismic data using traces of a seismic cross-section and processing the cross-sectional data with a predetermined binary function. Such seismic cross-sections and horizon data are displayed, but no smoothing of dips and azimuths is performed.

U.S. Pat. No. 5,191,526 to Laster et al. discloses a system and method which reduce noise in seismic data using Fast Fourier Transform methods in the frequency domain, and using an f-k filter technique, but no smoothing of image data such as dips and azimuths is performed.

U.S. Pat. No. 5,299,128 to Antoine discloses a system and method which reduce noise in seismic data using resistivity measurements of a sector of a borehole wall, but the application is limited to borehole data.

U.S. Pat. No. 5,588,032 to Johnson et al. discloses an inversion method for rapid real time imaging by processing data derived from wavefield energy transmitted and scattered by an object. Inverse scattering image processing is performed, but no smoothing of image data such as dips and azimuths is performed.

U.S. Pat. No. 6,018,498 to Neff et al. discloses a method for smoothing dips and azimuths by automatically picking faults in a recorded three-dimensional seismic trace data volume. Scanning of image data, for example, using test planes is used to determine the orientation of faults, but no smoothing of image data such as dips and azimuths is performed.

U.S. Pat. No. 6,516,274 to Cheng et al. discloses a method which calculates dips and azimuths by identification of structural and stratigraphic discontinuities using cross-correlations, but no smoothing of image data such as dips and azimuths is performed.

U.S. Pat. Nos. 6,675,097 to Routh et al. and 6,993,433 to Chavarria et al. disclose an inversion method using measurements of components of potential field data at a plurality of locations over a region of interest for analyzing gravity and magnetic measurement data, rather of seismic data.

U.S. Pat. No. 6,850,864 to Gillard et al. discloses a system and method which calculate dips and azimuths using a horizontal gradient in a seismic data volume. Gradients are only computed using simple finite difference methods, and no smoothing of seismic data is performed.

Patent publication number US 2002/0022930 and U.S. Pat. No. 6,473,697 to Bouts et al. disclose a method for smoothing dips and azimuths using a local orientation of the seismic data and determining an edge in a neighborhood of a voxel. Cross-correlations or semblance values are used, but no smoothing of image data such as dips and azimuths is performed.

Patent publication number US 2005/0222774 to Dulac et al. discloses a method for smoothing dips and azimuths using digital modeling and calculating an optimal offset of data.

Structurally-orientated smoothing is performed, but dips and azimuths are computed using cross-correlation methods.

Patent publication number US 2006/0122780 to Cohen et al. discloses a system and method for image analysis for processing seismic data for the identification of subterranean faults by computing three dimensional orientation of a subsurface using previously known computational methods such as Fourier transform methods.

It is therefore an object of this invention to provide a system and method for smoothing dips and azimuths that are capable of processing large volumes of data to suppress noise and to extract large-scale features.

BRIEF SUMMARY OF THE INVENTION

A system and method are provided which iterate through a loop of three steps: (1) set a "guide" direction (2) invert opposite vectors, and (3) average vectors to update the guide direction for smoothing seismic amplitude data. As used herein, directions and orientations are synonymous with vectors. A real data example shows that this inverse-vector method can overcome instabilities where the traditional structure-tensor approach fails. The inverse-vector smoothing is simple to implement and more computationally efficient. The resultant dips and azimuths are spatially consistent and thus more readily interpreted and suitable for calculation of curvature and other dip-based attributes.

The novel approach of the present invention is to average vectors explicitly after converting directions into orientations; that is, inverting vectors in terms of direction, but with no change of magnitude. The direction-to-orientation conversion involves mapping two-dimensional (2D) vectors into a 180° range, or three-dimensional (3D) vectors into a semi-sphere, centered at a "smoothed" direction which is unknown. Assuming an initial "guide" orientation, the opposite directions are then inverted, and the average of the directions is obtained within a neighborhood. The averaged value is then used as a new guide. Further iterations will likely converge and the "guide" direction reasonably represents dip and azimuth at that location. For comparison and completeness, a traditional way of averaging directions is disclosed, which is called the structure-tensor method. The structure tensor is the sum of dyadic product of vectors, and one of its eigenvectors represents the "average" direction, as described in Fehmers and Hocker, cited above, and Jahne, B. and Haubecker, H., "Computer Vision and Applications", Academic Press, 2000.

BRIEF DESCRIPTION OF THE DRAWINGS

Preferred embodiments of the invention are described below and with reference to the drawings in which.

DETAILED DESCRIPTION OF THE INVENTION

As shown in FIGS. 1-6, the present invention 10 includes a computer-based system 12 and method for processing a multi-dimensional image, such as inputted seismic amplitude data 14, for use in accurately analyzing geologic environments for improving petroleum production. Application of the method of the invention for inverse-vector smoothing generates a modified set of seismic data that are smoothed with the resultant dips and azimuths being spatially consistent and thus more easily interpretable for optimizing petroleum production.

Figure 1:
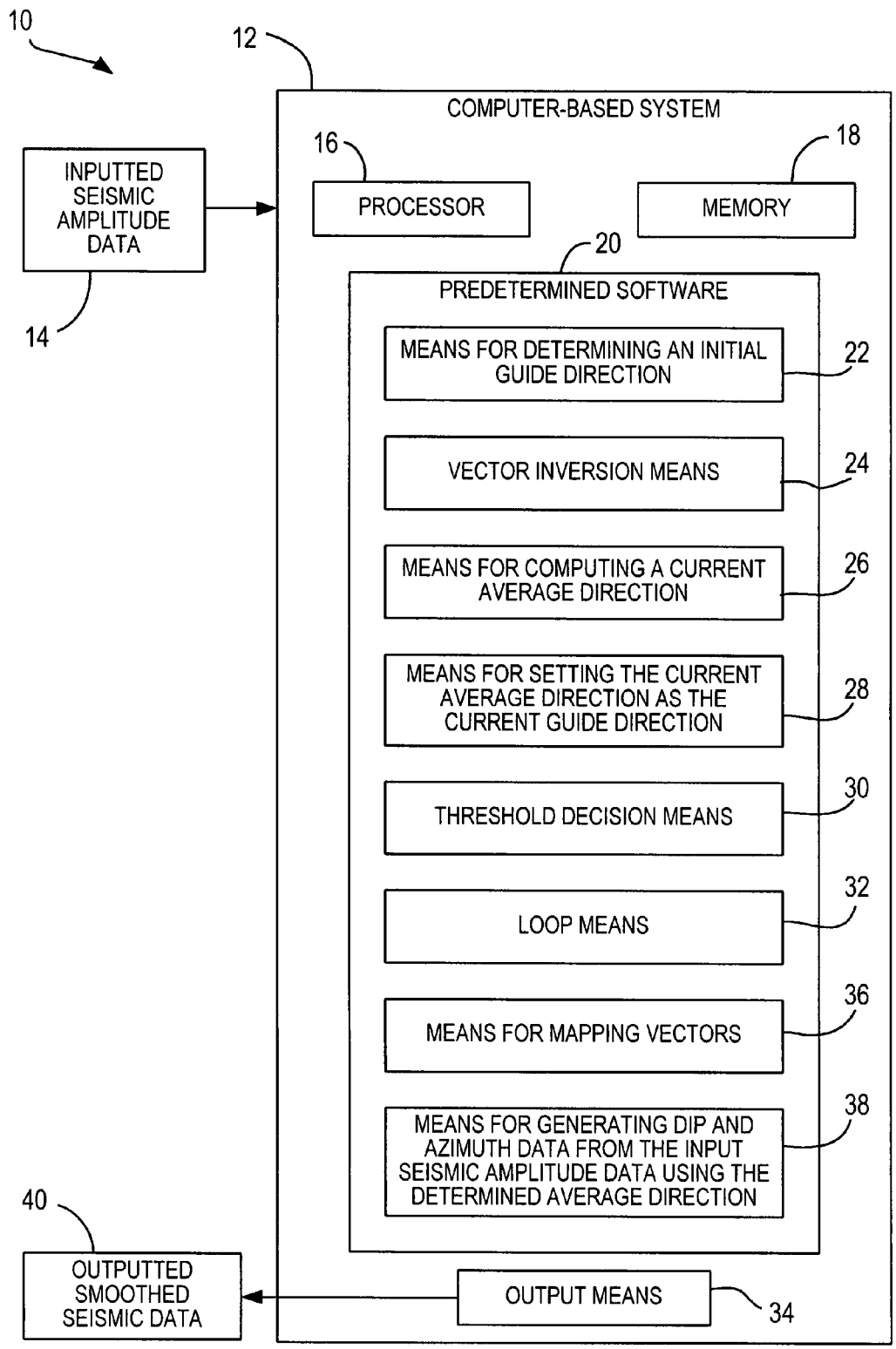
FIG. 1 is a schematic diagram of the computer-based system of the present invention.

The computer system 12 shown in FIG. 1 includes a processor 16 and memory 18 which receive and store the multi-dimensional seismic amplitude data 14 that is to be processed. The processor 16 can include a central processing unit (CPU) for executing predetermined software 20 implementing: means 22 for determining an initial guide direction of the plurality of vectors to be a current guide direction; means 24 for obtaining an inverse of the plurality of vectors that is opposite to the current guide direction; means 26 for computing a current average direction within a neighborhood of the plurality of vectors; means 28 for setting the current average direction as the current guide direction; threshold decision means 30 for determining if the current average direction has converged to within a predetermined numerical threshold such as one degree (1°) or, alternatively, less than 1% difference between iterations; and loop means 32 for repeating application of the means 24 for obtaining inverted vectors, means 26 for computing a current average direction, and means 28 for setting the current average direction until the current average direction leads to convergence within a predetermined threshold, with the convergent being the determined average direction, thereby smoothing the seismic data. Means 34 are also provided for outputting the smoothed seismic data 40, for example, on a printer, a plotter or a visual display.

In one embodiment, the means 26 for computing a current average direction includes means for performing a simple arithmetic averaging of the plurality of vectors. In an alternative embodiment, the means for computing a current average direction 26 includes means for applying a predetermined weighting function to the plurality of vectors.

In performing the determination of the initial guide direction, the means 22 for determining an initial guide direction can, in the first instance, set the initial guide direction to be flat in a 2D range of directions.

Means 36 for mapping the plurality of vectors can preferably be included. In one embodiment, the means 36 for mapping can map 2D vectors into a 180 degree range. In an alternative embodiment, the means 36 for mapping can map 3D vectors into a semi-spherical range.

In addition, the predetermined software 20 can include means 38 for generating dip and azimuth data from the input seismic amplitude data using the determined average direction.

Derivation of Structure-Tensor Approach

In this section, the structure-tensor method using the LaGrange multiplier method is derived. Although the method is well known in image processing, as in the Jahne and Haubecker reference described herein, and in Bakker, P. "Image Structure Analysis for Seismic Interpretation", Ph.D. thesis, Universiteit Delft, 2002, a detailed and complete formulation will help clarify the method, its usefulness and limitation.

When considering a seismic attribute (amplitude or phase), A(i,j,k), its normal direction is defined by gradients as:

$$\vec{n} = \frac{\{\nabla_x A, \nabla_y A, \nabla_z A\}}{\sqrt{[\nabla_x A]^2 + [\nabla_y A]^2 + [\nabla_z A]^2}} \quad (1)$$

The gradient can be computed from the simple symmetric finite difference:

$$\nabla_x A(i,j) = (A_{i+1,j} - A_{i-1,j}) \quad (2)$$

Alternatively, the enhanced isotropic operator can be used, as described in commonly assigned U.S. patent application Ser. No. 11/787,986, filed Apr. 17, 2007, and entitled ENHANCED ISOTROPIC 2D AND 3D GRADIENT METHOD, which is incorporated herein by reference in its entirety.

In the 2D case, the gradient using enhanced isotropic operator is:

$$\nabla_x A(i,j) = (A_{i+1,j} - A_{i-1,j}) + 0.25 \cdot (A_{i+1,j-1} + A_{i-1,j-1} + A_{i+1,j+1} - A_{i-1,j+1}) \quad (3)$$

and in 3D the gradient using the enhanced isotropic operator is:

$$\nabla_x A(i,j,k) = (A_{i+1,j,k} - A_{i-1,j,k})$$
$$+ 0.245 \cdot (A_{i+1,j-1,k} - A_{i-1,j-1,k} + A_{i+1,j+1,k} - A_{i-1,j+1,k})$$
$$+ 0.245 \cdot (A_{i+1,j,k-1} - A_{i-1,j,k-1} + A_{i+1,j,k+1} - A_{i-1,j,k+1})$$
$$+ 0.085 \cdot (A_{i+1,j-1,k-1} - A_{i-1,j-1,k-1} + A_{i+1,j+1,k+1} - A_{i-1,j+1,k-1})$$
$$+ 0.085 \cdot (A_{i+1,j-1,k+1} - A_{i-1,j-1,k+1} + A_{i+1,j+1,k+1} - A_{i-1,j+1,k+1}) \quad (4)$$

The present invention can employ any type of gradient operator, and is focused on the method of computing the "average" direction of normal vectors.

Figure 2:
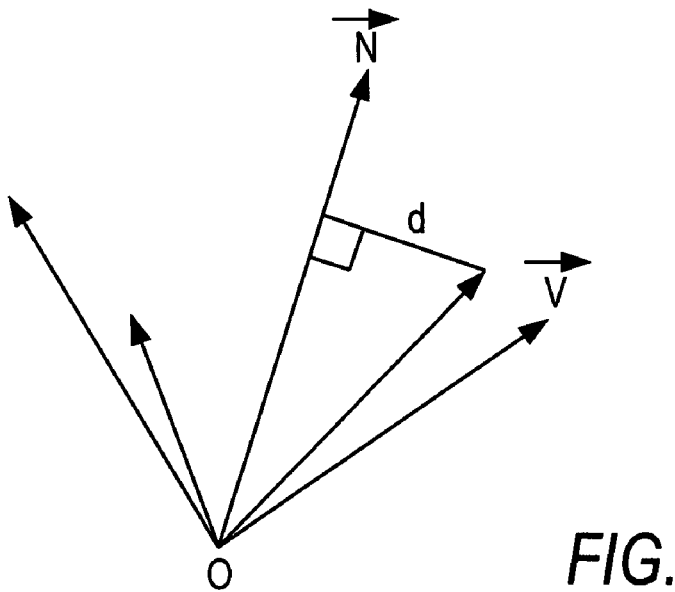
FIG. 2 illustrates raw vectors and an average direction.

Referring to FIG. 2, the vector $\overline{N}$, illustrated by the arrow ON, represents an "average" direction, whereas the other arrows are raw vectors. Minimizing the sum of squared distances leads to the structure-tensor approach. Assuming the average vector is in the ON direction, d is the distance from a vector $\overline{V}$, illustrated by the arrow OV, to the average vector $\overline{N}$. Applying the Pythagorean Theorem, one obtains:

$$d^2 = |v|^2 - |v \cdot n|^2 = v_x^2 + v_y^2 + v_z^2 - (v_x n_x + v_y n_y + v_z n_z)^2 \quad (5)$$

Obviously, when $\overline{V}$ is closer to $\overline{N}$, the fit is better. A quantity L is defined herein as the sum of squared distances. Minimizing such a quantity with the constraint that the magnitude of the average vector is unity, and using the LaGrange multiplier method, one obtains:

$$L = \sum d^2 + \lambda(|n|^2 - 1) \quad (6)$$
$$= \sum (|v|^2 - |v \cdot n|^2) + \lambda(|n|^2 - 1)$$
$$= \sum |v|^2 - \sum (v_x n_x + v_y n_y + v_z n_z)^2 + \lambda(n_x^2 + n_y^2 + n_z^2 - 1)$$

where L is a quantity to be minimized and $\lambda$ is a LaGrange multiplier. Setting $$\frac{\partial L}{\partial n_x} = 0; \quad \frac{\partial L}{\partial n_y} = 0; \quad \frac{\partial L}{\partial n_z} = 0, \quad (7)$$

the following is obtained:

$$-\Sigma 2 v_x (v_x \cdot n_x + v_y \cdot n_y + v_z \cdot n_z) + 2\lambda n_x = 0$$
$$-\Sigma 2 v_y (v_x \cdot n_x + v_y \cdot n_y + v_z \cdot n_z) + 2\lambda n_y = 0$$
$$-\Sigma 2 v_z (v_x \cdot n_x + v_y \cdot n_y + v_z \cdot n_z) + 2\lambda n_z = 0 \quad (8)$$

Rewriting the above three equations in a matrix form, the eigen problem is reached:

$$\begin{bmatrix} \sum v_x v_x & \sum v_x v_y & \sum v_x v_z \\ \sum v_y v_x & \sum v_y v_y & \sum v_y v_z \\ \sum v_z v_x & \sum v_z v_y & \sum v_z v_z \end{bmatrix} \begin{bmatrix} n_x \\ n_y \\ n_z \end{bmatrix} = \lambda \begin{bmatrix} n_x \\ n_y \\ n_z \end{bmatrix} \quad (9)$$

The solution of such an eigen problem is well known. The structure tensor S is defined as the collection of sums of dyadic products, that is, pairwise multiplications of raw vectors $$S = \begin{bmatrix} \sum v_x v_x & \sum v_x v_y & \sum v_x v_z \\ \sum v_y v_x & \sum v_y v_y & \sum v_y v_z \\ \sum v_z v_x & \sum v_z v_y & \sum v_z v_z \end{bmatrix} \quad (10)$$

Note that if a vector is inverted, its contribution to the structure tensor stays the same. Therefore, the structure tensor S is inverse invariant, and mapping from direction (sphere) to orientation (semi-sphere) is implicit and automatic.

In the ideal case, when all vectors within a smoothed window are pointing in the same direction, then trivially one eigenvalue is non-zero and the other two eigenvalues are zeros. The eigenvector associated with the non-zero eigenvalue is the one relevant to the overall vector direction. In practice, however, raw vectors are scattered. The largest absolute eigenvalue can be chosen arbitrarily, and its associated eigenvector can be obtained as an average (smoothed) direction. This is, in fact, the way in which the structure-tensor method smoothes directions.

From the above description of the methodology, it will immediately be understood that a difficulty can arise if a dominant eigenvalue does not exist. In such a case, two or three eigenvalues are of almost the same value. Because eigenvectors are orthogonal, and assuming that the true direction is parallel to one of the eigenvectors, choosing the wrong eigenvalue would result in a "smoothed" direction that is displaced by 90°. Such an erroneous assumption would lead to a major inaccuracy that is usually difficult to remedy. An analysis of these difficulties follows along with the resolution provided by the method of the invention.

Limitations of the Structure-Tensor Approach

Figure 3:
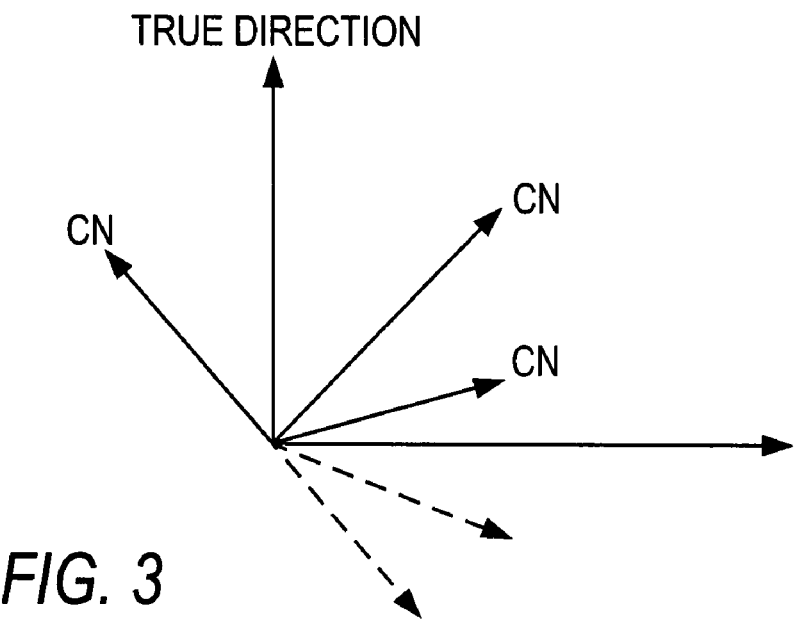
FIG. 3 illustrates a condition in which the raw directions are too scattered and the structure-tensor method can fail.

The following is an example in which the structure-tensor method cannot be utilized successfully. As illustrated in FIG. 3, the "true" normal is vertically upward. The average direction should be upward, but the structure tensor is insensitive to inversion of vectors and the rightward direction in FIG. 3 becomes the best fit. Accordingly, due to noise or other factors (such as non-conformity, bending, crossing fault, and the like), the computed normal directions (CN) are scattered around the true direction. As the structure-tensor method is inverse insensitive, it will invert two CN vectors as shown in dashed lines in FIG. 3, and find the optimal direction to be horizontally oriented. This type of error can be considered to be "inverse wrong then average". There is a remedy called coherence measure which helps determine the reliability of the resultant "average" direction. Even though the coherence measure has been found not to be robust, the errors occur where coherence measures are high. One can also see locations where resultant directions appear to be reasonable, but coherence measures are low.

The structure-tensor method works well if the vector scattering is not very severe. Actual seismic data can be contaminated with various kinds of noise or can cover geological complexities. Without additional constraints, it would be very difficult to judge which vector should or should not be inverted before an average is taken. In the present invention, known values from one iteration are used as prior knowledge in a subsequent iteration to function as extra constraints in the disclosed inverse-vector approach.

The Inverse-Vector Approach of the Invention

Figure 4:
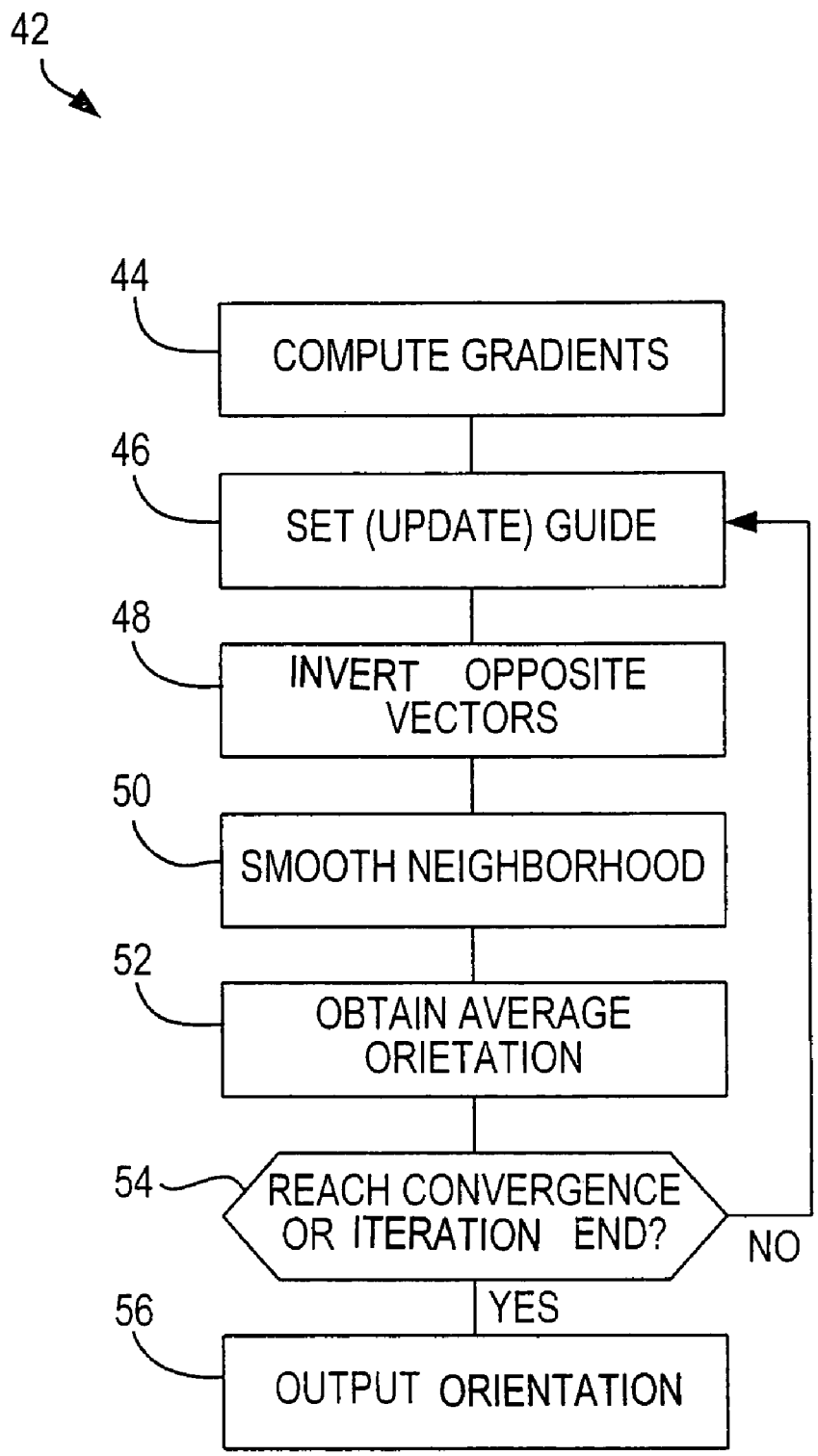
FIG. 4 is a flowchart summarizing the method of inverse-vector smoothing of the present invention.

Using the system 10, the present invention implements the method 42 shown in FIG. 4 using the various means 22-38. The method 42 is a recursive process: that is, it employs results obtained from a previous step to determine results in a next step. First, inputted seismic amplitude data 14 is pre-processed by the processor 16 to compute gradients in step 44, and an initial orientation as a guide is set up or selected in step 46, which could be simply flat. The method 42 then inverts those vectors "opposite" to the guide direction in step 48, averages all inverted vectors in the neighborhood of the guide orientation in step 50 to "smooth" the neighborhood, and then computes the average orientation in step 52. This resultant average provides a better estimation of orientation because random noise is partially cancelled out. The method 42 then determines in step 54 if convergence below a predetermined threshold is reached, or alternatively a predetermined number of iterations, such as 10 loops in the performance of computation steps, has ended.

If not, using the last estimation of the average orientation as a new guide, the method 42 loops back to step 46 and the guide orientation is updated. The method 42 then again obtains the inverse or "opposite" vectors in step 48, and averages all vectors within a neighborhood in step 50. The guide direction will approach a true average through the iterations. The initial guide in step 46 can be as simple as 0° dip everywhere. An averaging algorithm for vectors can be a simple arithmetic average on each vector component, or can be a weighted average using a predetermined set of weights or weighting functions. Three assumptions are employed: (a) true orientation changes slowly so the average of a neighborhood would give a good estimation; (b) random noise would be partially cancelled out by the averaging procedure; and (c) a reasonable initial estimate would lead to convergence. Simulations on real data support these assumptions, and reasonable dips and azimuths are produced.

EXAMPLE

Figure 5A:
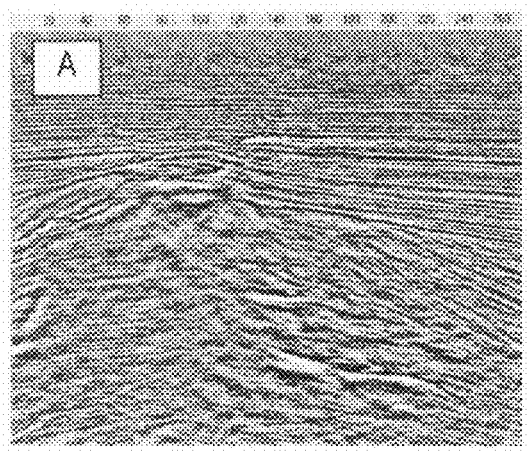
FIGS. 5A-5D are plots of seismic data, showing seismic amplitude data, the raw dips computed with finite difference, dips computed with the structure-tensor method, and inverse vector results, respectively.
Figure 5B:
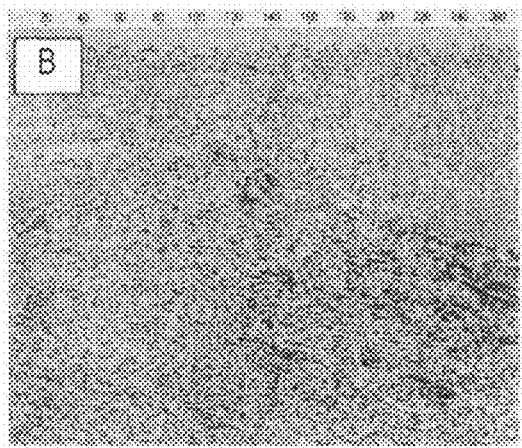
Figure 5C:
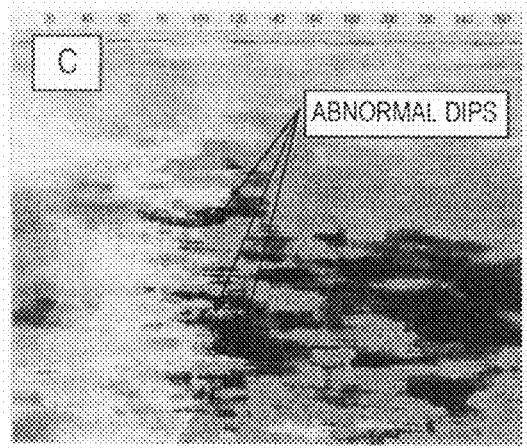
Figure 5D:
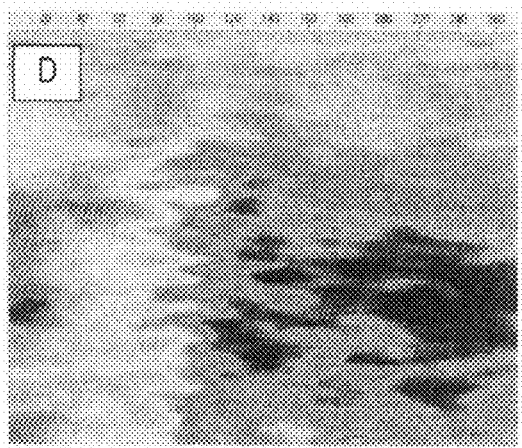
Figure 6:
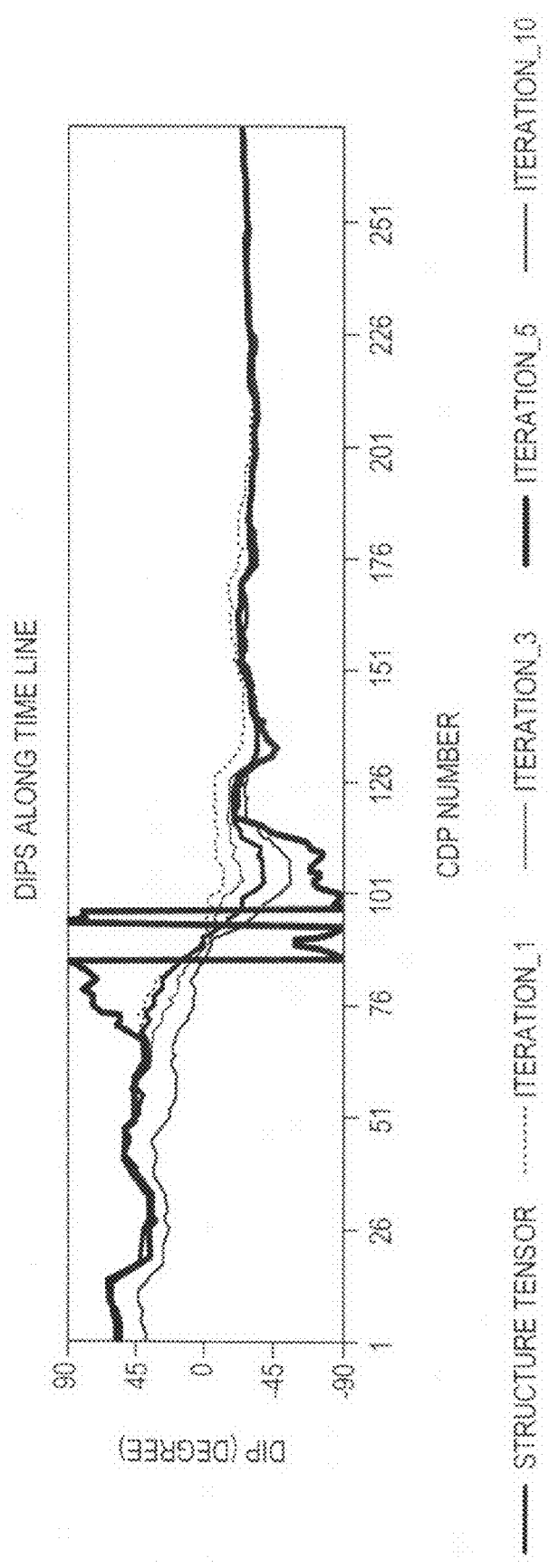
FIG. 6 is a comparison of inverse-vector smoothing with five iterations compared to a structure-tensor method where data is noisy and scattered.

The seismic amplitude data shown in FIG. 5A extends about 5 km underground and is sampled at 4 ms. The raw dips computed with a finite difference method are shown in FIG. 5B, which appear very scattered and un-interpretable. After applying 21×21 smoothing with the structure-tensor method described above, the results are shown in FIG. 5C, which result in abnormal dips being generated. However, application of the inverse-vector method of the present invention after five iterations generates the smoothed image as shown FIG. 5D. To compare the two methods in detail, a timeline is illustrated in FIG. 6. The structure-tensor method produces abnormal dips bouncing between +90° and −90°, due to "inverse wrong then average" as explained above in conjunction with FIG. 3. The inverse-vector method of the present invention overcomes these instabilities and produces more interpretable dips. The spatially consistent dips are essential in computing curvature and other dip based attributes.

As demonstrated by the above analysis and examples, the traditional structure-tensor method can fail to produce a correct average direction where data is noisy or scattered. The iterative inverse-vector method of the present invention overcomes this instability and produces interpretable dips and azimuths. The inverse-vector method is computationally efficient, and can generally be expected to be faster than the structure-tensor method. For example, with only the five interations shown in FIG. 6, the inverse-vector method was about four times faster than the structure-tensor method, thereby providing improved performance for identifying geologic structures during petroleum exploration for production.

Three-dimensional computation can be memory intensive. In case disk swapping is required, the rolling model of computation (i.e., rolling-in, rolling-through, rolling-out) is appropriate for both the structure-tensor method as well as for each and every iteration of the inverse-vector method. Alternatively, 3D orientation can be processed as 2D along inlines and crosslines separately. Thereafter, the 2D tangent direction can be obtained from its normal counterpart by a 90° rotation, or by equivalently swapping components. A cross-product of two 2D tangent vectors yields an orientation vector in a 3D direction. Processing 2D data typically does not require disk swapping, thus reducing the computational cost. In addition, the inverse-vector-based smoothing method of the present invention is applicable to both 2D and 3D seismic data.

Illustrative embodiments of the invention have been described with particularity, and it will be understood that numerous other modifications will be apparent to, and can be readily made by those of ordinary skill in the art without departing from the spirit and scope of the invention. Accordingly, it is not intended that the scope of the following claims be limited to the examples and descriptions set forth, but rather that the claims be construed as encompassing all the features of patentable novelty which reside in the present invention, including all features which would be treated as equivalents by those of ordinary skill in the art to which this invention pertains.

We claim:

1. A method using a computer-based system having a processor and a memory for determining an average direction of a plurality of vectors corresponding to seismic data stored in the memory, where the seismic data can be noisy or scattered, comprising the steps of:
   a) determining an initial guide direction of the plurality of vectors to be a current guide direction using the processor;
   b) obtaining an inverse-vector of the plurality of vectors opposite to the current guide direction;
   c) computing a current average direction within a neighborhood of the plurality of vectors using the inverse-vector;
   d) setting the current average direction as the current guide direction;

e) repeating the steps b-d until the current average direction leads to convergence within a predetermined threshold, with the convergent being the determined average direction, thereby smoothing the seismic data to obtain a smoothed vector corresponding to a dip and an azimuth; and f) outputting the smoothed seismic data.

2. The method of claim 1, wherein the step of averaging includes performing a simple arithmetic average of the plurality of vectors.

3. The method of claim 1, wherein the step of averaging includes applying a predetermined weighting function to the plurality of vectors.

4. The method of claim 1, wherein in the step of determining an initial guide direction, the initial guide direction is flat.

5. The method of claim 1, further comprising mapping two-dimensional (2D) vectors into a 180 degree range.

6. The method of claim 1, further comprising mapping three-dimensional (3D) vectors into a semi-spherical range.

7. The method of claim 1, further comprising generating dip and azimuth data from the input seismic data using the determined average direction.

8. A computer-based system having a processor for determining an average direction of a plurality of vectors corresponding to seismic data where the seismic data can be noisy or scattered, comprising:

a memory for storing the seismic data;

a processor including:

means for determining an initial guide direction of the plurality of vectors to be a current guide direction;

means for obtaining an inverse-vector of the plurality of vectors opposite to the current guide direction;

means for computing a current average direction within a neighborhood of the plurality of vectors using the inverse-vector;

means for setting the current average direction as the current guide direction; and means for repeating the application of the means for obtaining an inverse, means for computing a current average direction, and means for setting the current average direction until the current average direction leads to convergence within a predetermined threshold, with the convergent being the determined average direction, thereby smoothing the seismic data to obtain a smoothed vector corresponding to a dip and an azimuth; and means for outputting the smoothed seismic data.

9. The computer-based system as in claim 8, wherein the means for computing a current average direction includes means for performing a simple arithmetic average of the plurality of vectors.

10. The computer-based system of claim 8, wherein the means for computing a current average direction includes means for applying a predetermined weighting function to the plurality of vectors.

11. The computer-based system of claim 8, wherein in the means for determining an initial guide direction, the initial guide direction is flat.

12. The computer-based system of claim 8, further comprising means for mapping two-dimensional (2D) vectors into a 180 degree range.

13. The computer-based system of claim 8, further comprising means for mapping three-dimensional (3D) vectors into a semi-spherical range.

14. The computer-based system of claim 8, further comprising means for generating dip and azimuth data from the input seismic amplitude data using the determined average direction.

* * * * *